United States Patent [19]

Vermeiren

[11] Patent Number: 4,728,943
[45] Date of Patent: Mar. 1, 1988

[54] MEANS FOR DETERMINING THE STATE OF LUBRICATION IN SURFACES LUBRICATED BY A LUBRICANT AND ROLLING OR SLIDING WITH RESPECT TO ONE ANOTHER

[75] Inventor: Karel N. Vermeiren, Woerden, Netherlands

[73] Assignee: SKF Industrial Trading & Development Co. B.V., Netherlands

[21] Appl. No.: 881,120

[22] Filed: Jul. 2, 1986

Related U.S. Application Data

[63] Continuation-in-part of Ser. No. 712,965, Mar. 18, 1985.

[30] Foreign Application Priority Data

Apr. 6, 1984 [NL] Netherlands ............... 8401112

[51] Int. Cl.⁴ .................................. G08B 21/00
[52] U.S. Cl. ........................ 340/682; 324/61 R; 73/64; 384/624
[58] Field of Search ............. 340/603, 679, 682; 324/61 R; 73/64; 384/8, 448, 624

[56] References Cited

U.S. PATENT DOCUMENTS

| | | | |
|---|---|---|---|
| 4,060,965 | 12/1977 | Schwartz | 324/61 R X |
| 4,345,203 | 8/1982 | Vermeiren et al. | 324/61 R |
| 4,511,837 | 4/1985 | Vermeiren et al. | 324/61 R |

Primary Examiner—James L. Rowland
Assistant Examiner—Jeffery A. Hofsass
Attorney, Agent, or Firm—Eugene E. Renz, Jr.

[57] ABSTRACT

Means for determining the state of lubrication in surfaces lubricated by a lubricant and rolling or sliding with respect to one another, provided with a unit for generating a signal dependent upon the capacitance between the lubricated surfaces, characterized by an operating circuit connected to the unit which, in response to the signal dependent upon the capacitance, emits a second signal which is dependent in accordance with a non-linear, for example, exponential, function upon the capacitance between the lubricated surfaces such as that one and the same relative variation in the thickness of the lubricant between the lubricated surfaces results in a fairly great signal variation in the event of decreasing thickness, the second signal being supplied to an integrator which integrates the second signal over an integration period displaced in time and the output signal of which indicates the state of lubrication.

3 Claims, 4 Drawing Figures

MEANS FOR DETERMINING THE STATE OF LUBRICATION IN SURFACES LUBRICATED BY A LUBRICANT AND ROLLING OR SLIDING WITH RESPECT TO ONE ANOTHER

This is a continuation-in-part of application bearing Ser. No. 712,965 filed Mar. 18, 1985 and entitled Means for Determining the State of Lubrication in Surfaces Lubricated by a Lubricant and Rolling or Sliding with Respect to One Another.

The invention relates to a means for determining the state of lubrication in surfaces lubricated by a lubricant and rolling or sliding with respect to one another, provided with a unit for generating a signal dependent upon the capacitance between the lubricated surfaces.

In a known means of this kind, from the said signal are derived output signals which indicate the thickness of the lubricant film between the surfaces and the percentage of contact time during a given interval of measurement. Although this known means has the advantage that especially accurate measurement results are obtained, it is relatively complicated and the manufacturing costs are high. In addition, in the event of an undesirable state of lubrication an alarm signal can only be emitted if the thickness of the lubricant film goes below a minimum permissible value or if the percentage of contact time becomes too great. In practice, the state of lubrication will already have become quite poor before the thickness of the lubricant film has become impermissibly small or the percentage of contact time impermissibly great.

The object of the invention is to procure a means of the type mentioned at the beginning by which a possible undesirable state of lubrication may be accurately ascertained at an already very early stage.

For this purpose, the means pursuant to the invention is characterized by a processing circuit, connected to the said unit, which, in response to the signal dependent upon the capacitance, emits a second signal which is dependent in accordance with a non-linear, for example, exponential, function upon the capacitance between the lubricated surfaces such that one and the same relative variation in the thickness of the lubricant between the lubricated surfaces results in a fairly great signal variation in the event of decreasing thickness, the second signal being supplied to an integrator which integrates the second signal over an integration period displaced in time and the output signal of which indicates the state of lubrication.

In this way there is obtained a means emitting an output signal from which the state of lubrication of the lubricated surfaces may be directly derived, which state of lubrication may, if desired, be reproduced. The processing circuit makes it possible for one and the same relative variation in the thickness of the lubricant film between the lubricated surfaces, in the event of a great thickness of the said film, for example, the thickness of the lubricant film in the initial state of a new ball bearing or the like, to result in only a small output signal. In the event of decreasing thickness the influence of the same relative variation in the thickness increases sharply. In the case of an already sharply reduced thickness of the lubricant film between the surfaces, a halving, for example, of such thickness will indeed signify a sharp deterioration of the state of lubrication, while a halving of the thickness of the lubricating film in the initial state hardly worsens the state of lubrication.

Along with variations in thickness, the state of lubrication is at the same time determined by the possible presence of particles in the lubricant between the lubricated surfaces. Such particles may or may not be conductive. Conductive particles may come from the outside or may be caused by wear or spalling from a surface defect or a so-called "subsurface defect" occurring on the surface. Such metallic particles may be present in the lubricant between the surfaces or be joined to one of these surfaces by cold rolling. Changes in the surface roughness of the lubricated surfaces may therefore be caused by spalling of the surfaces or by particles being rolled on. In addition, hard non-conductive particles, such as, for example, grains of sand, may damage the surfaces and result in a change in surface roughness.

All of the aforementioned factors have an influence on the signal dependent upon the capacitance between the lubricated surfaces. In the means pursuant to the invention these factors likewise have a fairly strong influence on the output signal in the event of a fairly thin layer of lubricant between the lubricated surfaces.

The invention is explained in greater detail below with the aid of the drawings, wherein an example of the means pursuant to the invention is represented and wherein.

Figure 1:
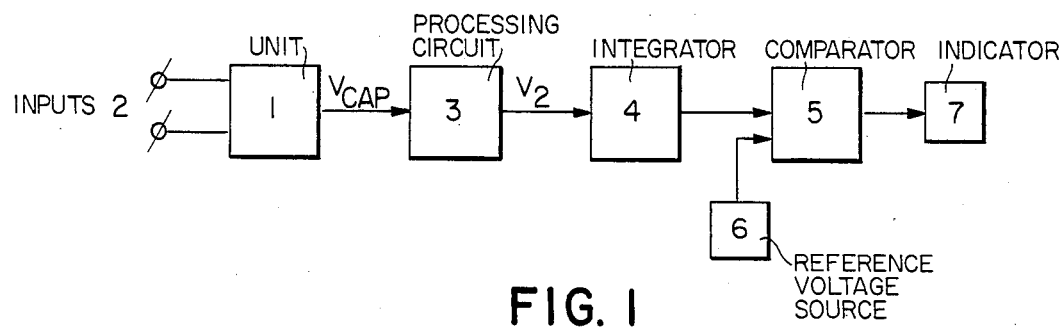
FIG. 1 is a block diagram of an embodiment of the means pursuant to the invention.
Figure 2:
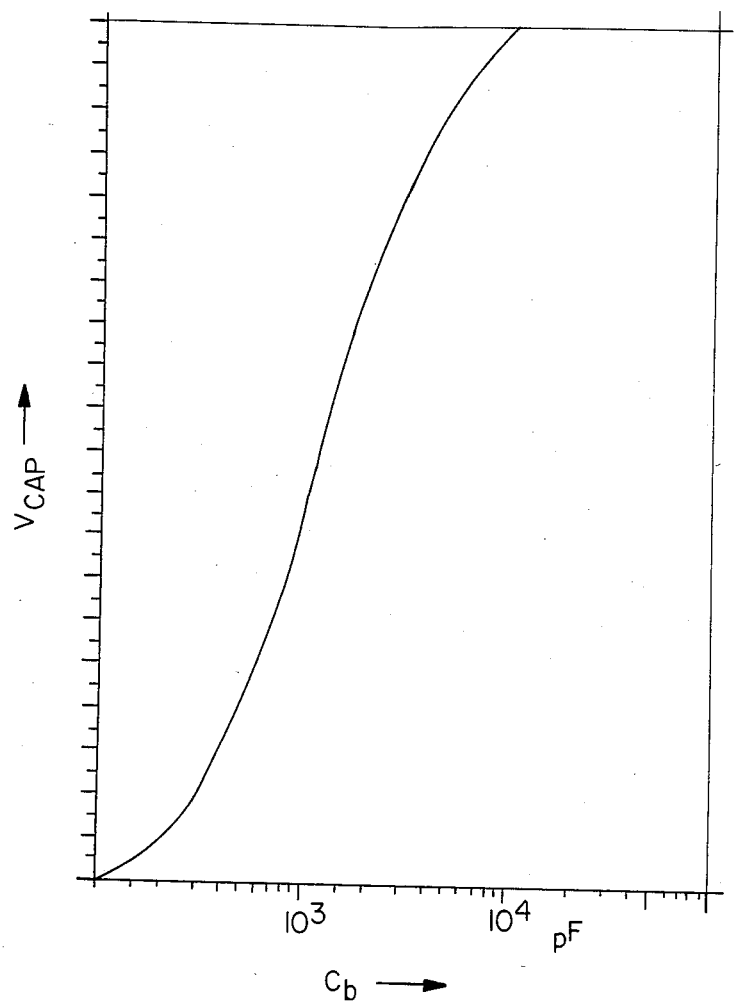
FIG. 2 is a graph in which the signal dependent upon the capacitance between the lubricated surfaces is shown as a function of such capacitance.

In FIG. 1 is depicted a block diagram of a means for determining the state of lubrication in surfaces lubricated by a lubricant and rolling or sliding with respect to one another, for example in a ball bearing. For this purpose the means is provided with a unit 1, the inputs 2 of which may be connected with, for example, the inner and outer races of the ball bearing. The unit 1 produces at its output a signal $V_{CAP}$, which is dependent upon the capacitance between the inner and outer races. The signal $V_{CAP}$ produced is shown in FIG. 2 as a function of the capacitance between the lubricated surfaces. Here the signal $V_{CAP}$ is displayed on a linear scale, the capacitance on a logarithmic scale. Typical ways of obtaining accurate values for $V_{CAP}$ are disclosed in commonly owned U.S. Pat. Nos. 4,345,203 and 4,511,837.

The capacitance between the lubricated surfaces is inversely proportional to the thickness of the lubricant between the lubricated surfaces, so that $C_1/C_2 = h_2/h_1$. When a given thickness $h_1$ of the lubricant film is selected as reference value, which thickness corresponds, for example, to a capacitance of 500 pF, the capacitance axis of the graph in FIG. 2 may be expressed in the manner indicated as $h/h_{ref}$. In this connection, it is apparent that one and the same relative variation in the thickness of the lubricant film between the lubricated surfaces over the whole range of capacitance of importance results in approximately the same variation of the signal $V_{CAP}$. The thinner the lubricant film, however, the greater the possibility that, with one and the same relative variation in thickness, poor lubrication and possibly even metallic contacts may occur.

The variations in the capacitance between the lubricated surfaces are caused by roughness of the surfaces moving with respect to one another and by particles present in the lubricant. A change in the roughness of the surfaces, such as, for example, the races in a ball bearing, may be produced by spalling, the settling of particles on these surfaces of the formation of impressions in these surfaces by hard particles, such as grains of sand.

Figure 3:
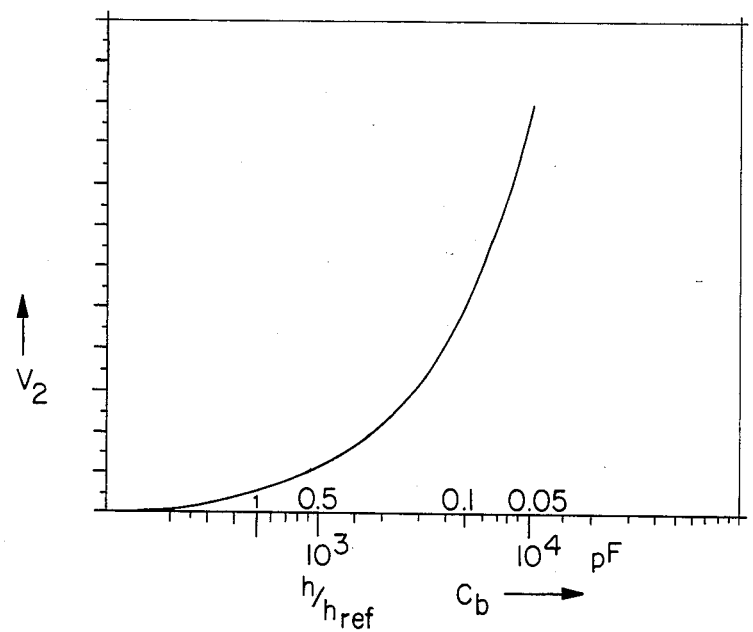
FIG. 3 is a graph in which the second output signal is shown as a function of the capacitance between the lubricated surfaces.

To the unit 1 is connected a processing circuit 3, the output of which emits a signal $V_2$ in response to the signal $V_{CAP}$ dependent upon the capacitance. This signal is dependent upon the capacitance between the lubricated surfaces in accordance with a non-linear function, for example, an exponential function. The signal $V_2$ is shown in the graph in FIG. 3 as a function of the capacitance or $h/h_{ref}$. It appears from this graph that one and the same relative variation in the thickness of the lubricant between the lubricated surfaces, results, in the event of fairly small thicknesses, in a fairly great variation in the signal $V_2$. This signal $V_2$ is supplied to an integrator 4 which integrates the signal over an integration period displaced in time. These integration periods may be set at, for example, 0.1, 1 and 10 s. By this means the output signal of the integrator forms a measurement of the state of lubrication of the surfaces lubricated by the lubricant.

The processing circuit 3 ensures that variations in the capacitance between the surfaces in the event of a thick film of lubricant between the surfaces result in only a small output signal from the integrator 4. In the event of a thick film of lubricant, the detrimental influence of any possible surface roughness and/or particles in the lubricant on the state of lubrication is, in practice, not great either. In the event of a small thickness of the lubricant film, however, this influence on the state of lubrication is very serious. It appears in FIG. 3 that with a thin film of lubricant the signal $V_2$, in case of variations in capacitance, will likewise vary sharply, so that the output signal of the integrator 4 will be great.

Figure 4:
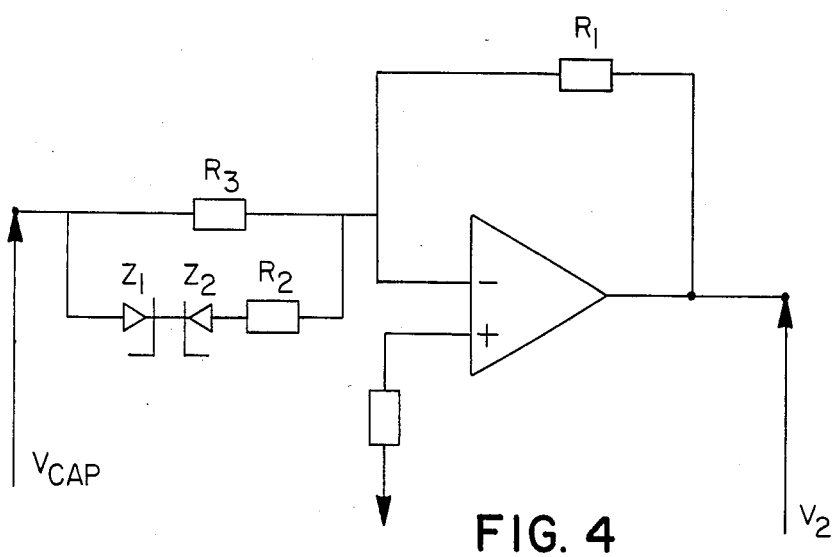
FIG. 4 is a schematic view of the circuit of box 3 on FIG. 1.

FIG. 4 is a schematic drawing of one embodiment of circuit 3 which is admirably suited for the operation of the present invention. As shown in FIG. 4. $V_{CAP}$, as previously described, is the output signal from unit 1, and is dependent upon the capacitance between the inner and outer races. When $V_{CAP}$ is less than $V_{z1}$, the voltage back bias of the zener diode Z1 causes Z1 to act as an open circuit. As a result, the circuit operates as a normal operational amplifier:

$$V_2 = (-R_1/R_3) \times V_{CAP}.$$

As the $V_{CAP}$ increases, as capacitance indicates the lubrication layer is thin, it exceeds $V_{Z1}$. For additional protection, a second zener diode Z2 is also in the circuit. The back bias voltage of $V_{Z1}$ would typically be from 5 to 15 volts, depending upon the diode chosen for the particular unit. $V_{Z2}$, the regular foward bias, would be much less, such as 0.3 to 0.9 volts. When $V_{CAP}$ exceeds the combined $V_{Z1}$ and $V_{Z2}$, when $V_{Z1}$ is relatively small, say 0.7 volts, the circuit operates with $R_2$ and $R_3$ now acting in parallel. As a result, a larger change in $V_Z$ is observed with a change in $V_{CAP}$. The amplifier gain becomes: $V_2 = (-R_1/R_2 R_3) \times V_{CAP}$. Obviously, since the effect from $R_3$ alone is larger than the effect from $R_2$ plus $R_3$ in parallel, when $V_{CAP}$ is low, i.e. lower than $V_{Z1}$, there will be a small gain in $V_Z$. When $V_{CAP}$ is large, i.e. higher than $V_{Z1} + V_{Z2}$, there will be a large gain in $V_2$. The output from FIG. 4, $V_Z$ will generate the curve shown in FIG. 3.

It appears from the foregoing that the output signal of the integrator 4 may be used directly as an indication for the state of lubrication, for example, by reproducing this output signal as a function of the state of lubrication.

The output signal of the integrator 4 may alternatively be supplied to the one input of a comparator 5, the outer input of which receives an adjustable reference voltage from a reference voltage source 6. When the output signal of the integrator 4 exceeds the reference voltage, the output of the comparator 5 supplies an alarm signal to an indicator 7, by which the poor state of lubrication is signalled.

The means described may be used advantageously when an early alarm is necessary upon the occurrence of a poor state of lubrication, such as, for example, in testing the service life of ball bearings and the like.

The invention is not limited to the embodiment described above, which may be varied in a variety of ways within the scope of the invention.

What is claimed is:

1. Means for determining the state of lubrication in surfaces lubricated by a lubricant and rolling or sliding with respect to one another, provided with a unit for generating a signal dependent upon the capacitance between the lubricated surfaces, characterized by an operating circuit, connected to said unit, which, in response to the signal dependent upon the capacitance, emits a second signal which is dependent in accordance with a non-linear, for example, exponential, function upon the capacitance between the lubricated surfaces such as that one and the same relative variation in the thickness of the lubricant between the lubricated surfaces results in a fairly great signal variation in the event of decreasing thickness, the second signal being supplied to an integrator which integrates the second signal over an integration period displaced in time and the output signal of which indicates the state of lubrication.

2. Means according to claim 1, characterized in that the integration period of the integrator is adjustable.

3. Means according to claim 2, characterized in that a comparator is installed, the one input of which receives the output signal from the integrator, while the other input receives a reference value, the output of the comparator emitting an alarm signal when the output signal of the integrator exceeds the reference value.

* * * * *